United States Patent Office 3,468,671
Patented Sept. 23, 1969

3,468,671
**PROCESS FOR THE PRODUCTION
OF WHIPPED CREAM**
Arthur Bratland, Konnerudgaten 3, Drammen, Norway
No Drawing. Filed Aug. 12, 1965, Ser. No. 479,293
Int. Cl. A23c *13/00*
U.S. Cl. 99—60                                    11 Claims

ABSTRACT OF THE DISCLOSURE

A whipping cream of low fat content is obtained by combining a cream of more than 30% butterfat with buttermilk to produce a whipping cream of from 15% to 25% butterfat. Skim milk or sodium caseinate can be added to improve the short consistency when the whipping cream is of less than 20% butterfat.

---

This invention relates to a process for the production of whipped cream.

In the production of whipped cream, the cream can only be whipped to natural cream, that is to say without the addition of foreign materials such as emulsifiers, thickening agents and the like, when it contains more than thirty percent fat. For whipping to natural cream, there is used, therefore, virtually exclusively whipping cream which contains about 35 percent milk fat. There is, however, great need for cream having a lower fat content. This can only be obtained by means of special additives as mentioned above. Firstly, such a product will, however, no longer be a pure milk product, while the cream obtained has in many ways other properties and, in part, even a flavour other than that of natural cream, and on the other hand the food laws make the strictest requirements for such additives. No longer can the product obtained be represented as "whipped cream" either. It is an object of the invention to provide a process for the production of whipped cream from cream in which the product obtained will be a pure milk product, despite the fact that the cream which is to be whipped, has a fat content below 30 percent, for example, from 15 percent to 25 percent.

According to the present invention a process of producing whipped cream comprises mixing whipping cream and buttermilk of zero or low acidity (i.e., of a pH value of at least 5.5 as is known in the art) to form a cream having a fat content of less than 30 percent, and whipping the cream so formed.

As is known, buttermilk is the fluid which is left behind in butter churning. In modern dairy operations today, there is mainly used fresh, non-acidic or only weakly acidic whipping cream for the production of butter, so that the buttermilk which is obtained, is at the most only weakly acidic. In spite of this, buttermilk today represents a waste product for the dairies, because with its characteristic flavour it is not pleasing to the public.

Surprisingly it has now been found, that if the fluid in, for example, a 20 percent cream is allowed to consist fo equal proportions of whipping cream and buttermilk, the product will be just as easily whippable as whipping cream. It is equally surprising that the cream obtained will have a flavour which cannot be distinguished from cream produced from whipping cream.

It has even been possible to produce whipped cream from a cream which contains somewhat less than 15 percent fat, if the fat-free portion in the starting cream consist of buttermilk exclusively.

The buttermilk used can be fresh buttermilk as it comes directly from the churn, but it has also been found that recombined buttermilk can be used, that is to say buttermilk which has been initially dried to a powder and subsequently converted to buttermilk again by stirring the powder in water.

A quite important property of cream is its consistency. Usually a "short" cream is desired. However, it can happen that a cream can be said to have too "long" a consistency, that is to say that it appears gelatinous. This is an unfortunate property which often occurs with such creams having foreign additives as mentioned earlier. It now appears however, that a 20 percent cream having exclusively buttermilk as the fat-free constituent can even tend to become too "short" in consistency. According to a further feature of the invention, this can be remedied either by the addition of conventional skimmed milk (fresh or recombined) or by the addition of sodium caseinate or other alkali metal caseinate in an amount of from 0.05 to 0.2 percent based on the cream formed. Since the latter is also a substance which is derived from milk, a cream will still be obtained which is a pure milk product.

The invention will now be illustrated by the following examples.

Example 1

To one part of whipping cream, there was added one part of buttermilk, non-acidic and fresh, as it came from the churn of non-acidic butter for export. The cream obtained had a fat content of about 18 percent fat. To the mixture, there was added 0.1 percent sodium caseinate. Afterwards the cream was whipped.

A cream was obtained having a consistency which could not be distinguished from cream produced by whipping of whipping cream. By performing flavour tests with a conventional "test panel," in which the persons tested did not know what origin the product had, it was found to be impossible to distinguish this cream from the cream of whipping cream, in spite of the fact that it had a fat content half that of the cream prepared from whipping cream.

Example 2

To three parts of whipping cream, there was added two parts of fresh, non-acidic buttermilk and one part of skimmed milk. This cream, having a fat content of about 18 percent, was whipped to cream. Both the consistency and the flavour was absolutely the same as cream from whipping cream.

Example 3

Fresh, non-acidic buttermilk was concentrated at 45° C. and then dried by spray drying, so that buttermilk powder was obtained. Prior to concentration 0.1 percent of trisodium phosphate was added for stabilisation.

After production and a weeks storage, recombined buttermilk was produced by stirring with a suitable amount of water during a homogenisation operation. At the same time ten percent skimmed milk was added.

The buttermilk was mixed together with whipping cream to a cream having a fat content of 22 percent, which was then whipped to a cream. The cream obtained had a flavour and consistency which prevented it being distinguished from the cream prepared from pure whipping cream.

What I claim is:

1. A pure milk whipped cream containing butterfat in an amount of from 15 percent to 25 percent and buttermilk in an amount sufficient to make said cream easily whippable.

2. A pure milk whipped cream as set forth in claim 1 wherein said buttermilk constitutes one half of said whipping cream.

3. A process of producing whipped cream from pure milk ingredients which comprises the steps of mixing whipping cream and buttermilk having a low acidity in an amount sufficient to produce an easily whippable cream and to lower the fat content of said cream to about 15 to 25 percent, and whipping the cream so formed.

4. A process according to claim 3 in which a minor proportion of the buttermilk is replaced by skimmed milk.

5. A process of producing whipped cream from pure milk ingredients which comprises the steps of mixing whipping cream and buttermilk of low acidity or zero acidity in equal proportions to each other to form a cream having a fat content of about 15 to 25 percent, and whipping the cream so formed.

6. A process of producing whipped cream from pure milk ingredients which comprises the steps of mixing whipping cream and buttermilk having a low acidity in an amount sufficient to produce an easily whippable cream and to lower the fat content of said cream to about 15 to 25 percent, incorporating an alkali metal caseinate therein in sufficient quantity to improve the consistency of the whipped product and whipping the cream so formed.

7. A process according to claim 6 in which the alkali metal caseinate is present in an amount of from 0.05 to 0.2 percent based on the cream formed.

8. A process of producing whipped cream from pure milk ingredients which comprises the steps of mixing whipping cream and buttermilk, said buttermilk being prepared by recombining buttermilk powder with water to produce a buttermilk having a low acidity and being added to said cream in an amount sufficient to produce an easily whippable cream and to lower the fat content of said cream to about 15 to 25 percent, and whipping the cream so formed.

9. A process according to claim 8 in which a minor proportion of the buttermilk is replaced by skimmed milk.

10. A process according to claim 8 in which an alkali metal caseinate is added to the cream formed.

11. A process according to claim 10 in which the alkali metal caseinate is present in an amount of from 0.05 to 0.2 percent based on the cream formed.

References Cited

UNITED STATES PATENTS

| 2,250,300 | 7/1941 | Goosmann | 99—60 |
| 2,757,092 | 7/1956 | Zepp et al. | 99—136 X |

FOREIGN PATENTS 1,378,383  11/1963  France.

OTHER REFERENCES

Journal of Dairy Science, vol. 27, Jan.-June 1944, pp. 419–432. SF221. J8.

McDowall, F. H.: Buttermaker's Manual, vol. II, 1953, New Zealand University Press, Wellington C. 1, New Zealand, p. 971. SF263. M25.

A. LOUIS MONACELL, Primary Examiner

D. M. NAFF, Assistant Examiner

U.S. Cl. X.R.

99—54